(No Model.) 2 Sheets—Sheet 1.

W. H. McCOWAN.
WAGON BRAKE.

No. 391,170. Patented Oct. 16, 1888.

WITNESSES:
INVENTOR: W. H. McCowan
BY Munn & Co
ATTORNEYS.

(No Model.) 2 Sheets—Sheet 2.

W. H. McCOWAN.
WAGON BRAKE.

No. 391,170. Patented Oct. 16, 1888.

WITNESSES:
John W. Deemer
C. Sedgwick

INVENTOR:
W. H. McCowan
BY Munn & Co
ATTORNEYS.

UNITED STATES PATENT OFFICE.

WILLIAM HENRY McCOWAN, OF WATERTOWN, OHIO.

WAGON-BRAKE.

SPECIFICATION forming part of Letters Patent No. 391,170, dated October 16, 1888.

Application filed May 25, 1888. Serial No. 275,038. (No model.)

*To all whom it may concern:*

Be it known that I, WILLIAM HENRY MC-COWAN, of Watertown, in the county of Washington and State of Ohio, have invented a new and Improved Wagon-Brake, of which the following is a full, clear, and exact description.

This invention relates to wagon brakes, and has for its object to provide a wagon-brake which will be simple in construction, easy in operation, and effective.

The invention consists in a wagon-brake constructed and arranged as hereinafter described and claimed.

Reference is to be had to the accompanying drawings, forming a part of this specification, in which similar figures of reference indicate corresponding parts in both the views.

Figure 1:
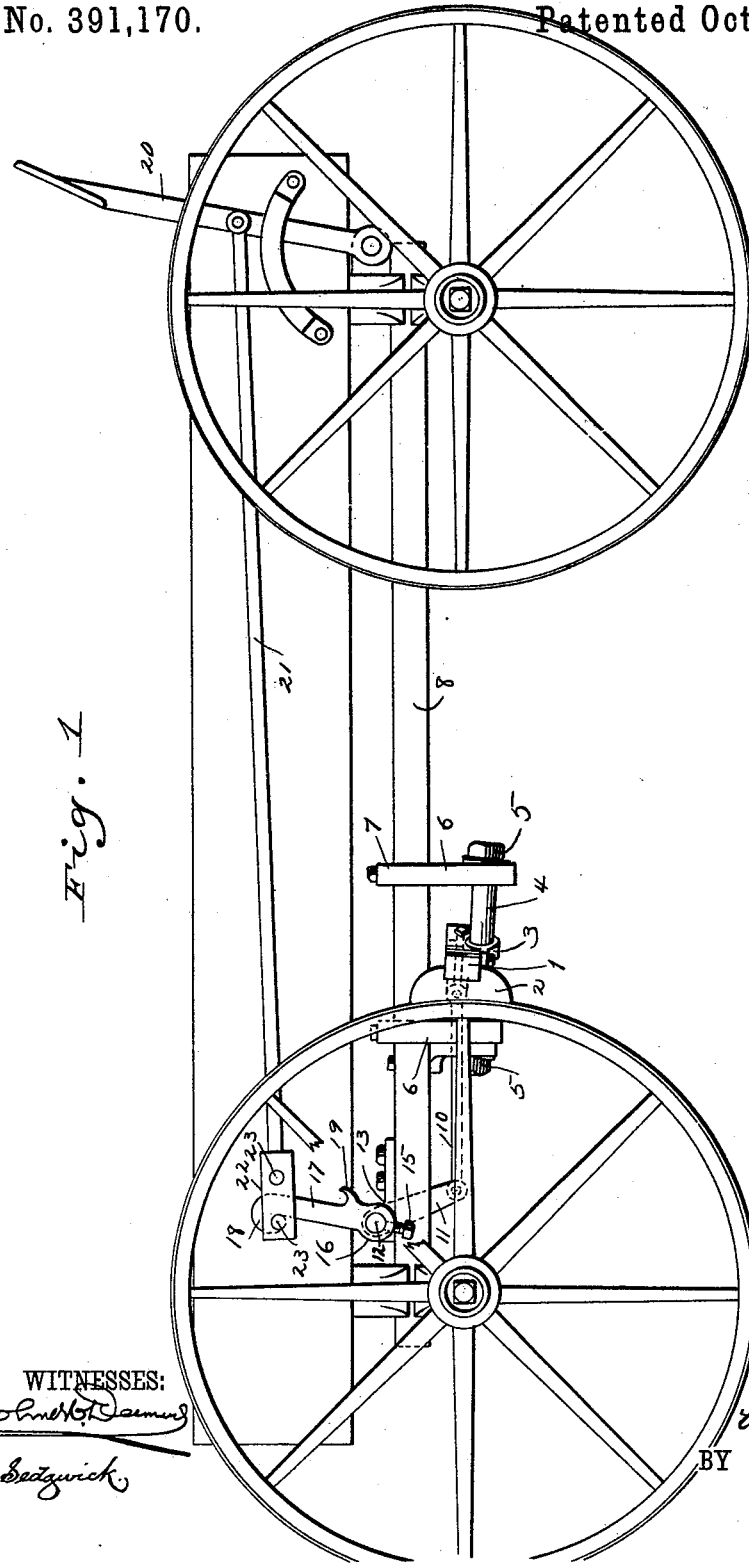
Figure 2:
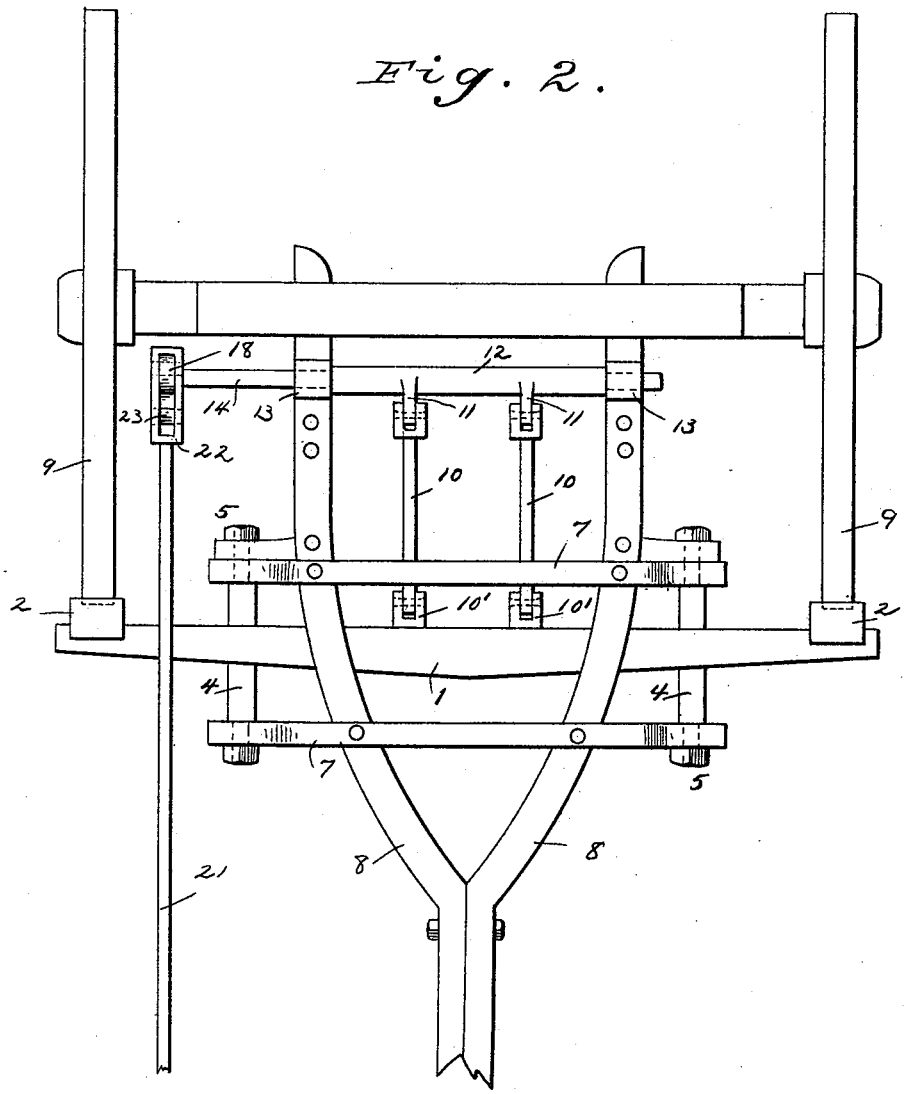

Figure 1 is a side view of a wagon with the invention applied thereto, and Fig. 2 is a plan view of the brake with parts broken away.

In the construction of the invention a sliding brake-bar, 1, with brakes 2, is provided with sleeves 3, bolted thereto and movable on the rods 4, secured by nuts 5 to the depending ends 6 of cross-bars 7, fastened to the wagon-reach 8. The parts are so located as to bring the brakes 2 in a convenient position to have a short range of movement in front of the wheels 9.

The brake-bar 1 is operated by means of draw-bars 10, pivoted at one end in lugs 10' on the brake-bar, and at their other end to arms 11 on a rotary bar, 12, pivoted in bearings 13 on the reach 8. The rotary bar 12 has an extension, 14, to which is adjustably secured by a set-screw, 15, the sleeved end 16 of an arm, 17, formed with a hooked end, 18, and hook projection 19 on its opposite side adjacent to its connection with bar 12. The latter is connected with a pedal-lever, 20, by a rod, 21, pivoted at one end to the lever 20, and having at its other end a sleeve, 22, with cross-bars 23, the arm 17 projecting through sleeve 22. By means of this construction only a slight movement of lever 20 is necessary to operate the brake, as the pull on the arm 17 will be adjacent to its connection with bar 12. When the brakes 2 are out of engagement with wheels 9, the sleeve 22 will be located at the lower end of arm 17, with the inner cross-bar, 23, resting in hook-projection 19. Upon applying the brake, the rod 21 drawing the arm 17 forward, the sleeve 22 moves upward, the outer cross-bar 23 riding up over the arm 17 until it is brought into engagement with the hooked end 18 of the latter, when the brakes 2 are drawn tight against the wheels 9, as shown in Fig. 1. Upon releasing the brake and moving back rod 21 and arm 17, the sleeve 22 drops down and the inner cross-bar 23 is thrown into engagement with hook projection 19, thereby requiring but a slight rear movement of lever 20 to push back arm 17, rotate bar 12, and release brakes 2. The throw of lever 20 may be adjusted by releasing set-screw 15 and setting arm 17 to any desired position from a vertical on extension 14.

It is obvious that instead of a pedal-lever 20 a lever extending up by the driver's seat and worked by hand may be employed.

By means of this construction and arrangement a strong leverage is obtained to brake the wheels with but little power and by a slight movement of the lever 20. The parts will move easily and rattling and jar of the parts will be avoided.

Having thus described my invention, what I claim as new, and desire to secure by Letters Patent, is—

1. The combination, with the reach, the cross-bars 7, secured thereto in front of the axle and having depending ends, and rods connecting said depending ends, of the brake-bar having bearings sliding on the said rods, and an operating mechanism, substantially as set forth.

2. The combination, with the reach, the cross-bars 7, secured thereto in front of the axle and having depending ends 6, and the longitudinally-extending rods 4, connecting said depending ends, of the brake-bar 1 under the reach and having sleeves 3 near its ends sliding upon the rods 4, and an operating mechanism, substantially as set forth.

3. The combination, with the reach, the sliding brake-bar, and vertically-rocking shaft 12 in rear of said bar and provided with arms 11, and an operating-arm, of the bars or links 10, pivotally connected to said arms 11 and to the brake-bar, and a rod connected to said operating-arm and to an operating-lever, substantially as set forth.

4. The combination, with the brake-operating rock-shaft having an upwardly-extending operating-arm, 17, provided with a hook or projection, 18, at one edge of its upper end, and a projection or hook, 19, on its opposite edge below the hook or projection 18, of the operating-rod having a sleeve embracing the arm 17 to slide thereon, and having front and rear cross-pieces 23, to engage alternately said parts 18 19, substantially as set forth.

5. The combination, with the sliding brake-bar 1, mounted on rods 4 in depending ends 6 of cross-bars 7, the rotary bar 12, with extension 14, and arms 11, and draw-bars 10, pivoted to brace-bar 1 and arms 11, of the arm 17, connected to extension 14 by sleeve 13 and set screw 15, and having adjacent thereto hook projection 19, and at its outer end hook 18, and pedal-lever 20, with connecting-rod 21, having sleeve 22, with cross-bars 23, the sleeve 22 loosely engaging arm 17, substantially as shown and described.

WILLIAM HENRY McCOWAN.

Witnesses:
E. J. GREEN,
C. B. WOOD.